No. 696,301. Patented Mar. 25, 1902.
J. H. BARNARD.
METHOD OF TRANSMITTING POWER FOR PERFORMING USEFUL WORK.
(Application filed Oct. 23, 1901.)
(No Model.) 3 Sheets—Sheet 2.
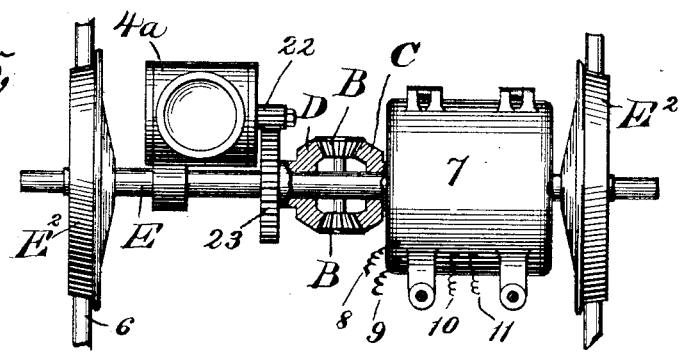
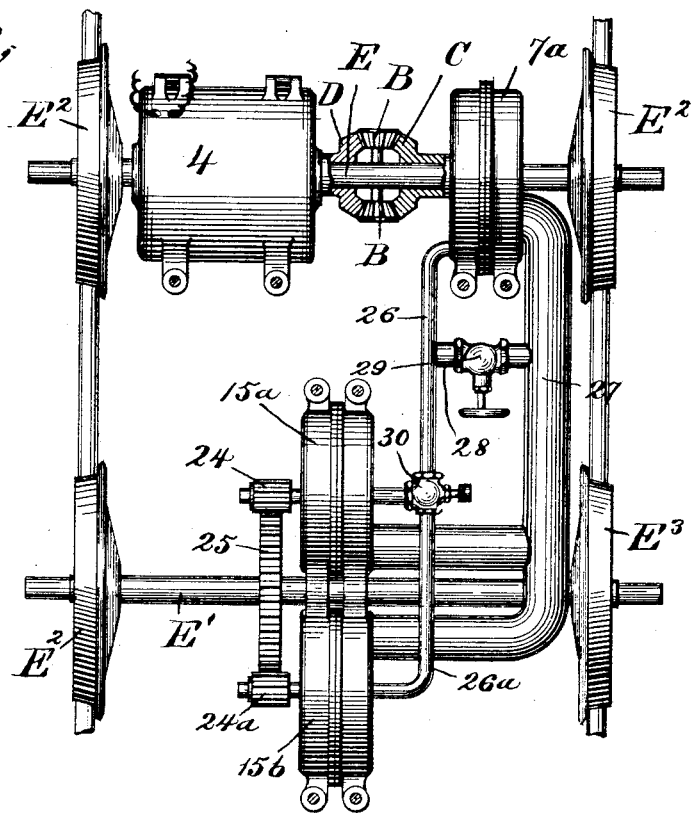
WITNESSES:
INVENTOR
J. H. Barnard
BY
ATTORNEYS No. 696,301. Patented Mar. 25, 1902.
J. H. BARNARD.
METHOD OF TRANSMITTING POWER FOR PERFORMING USEFUL WORK.
(Application filed Oct. 23, 1901.)
(No Model.) 3 Sheets—Sheet 3.
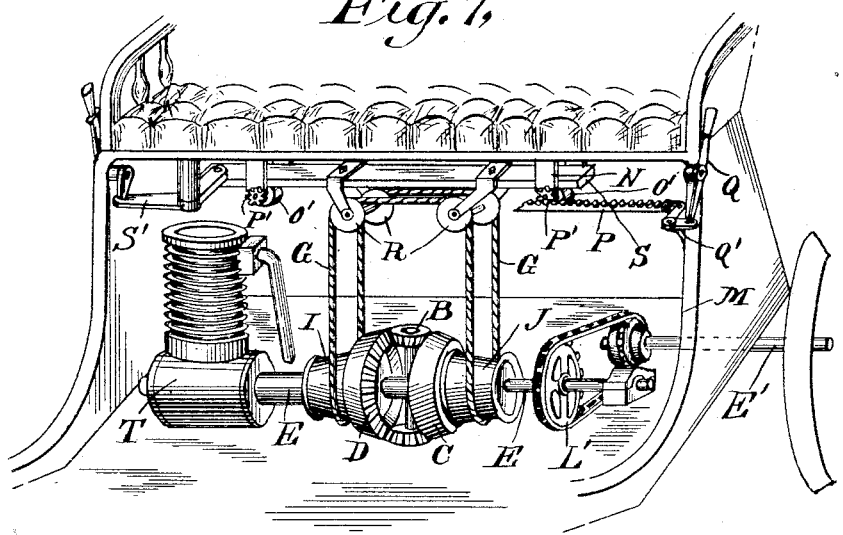
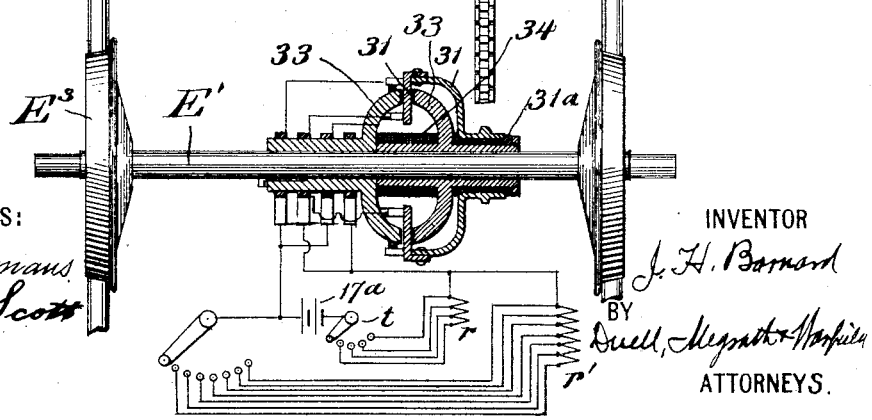

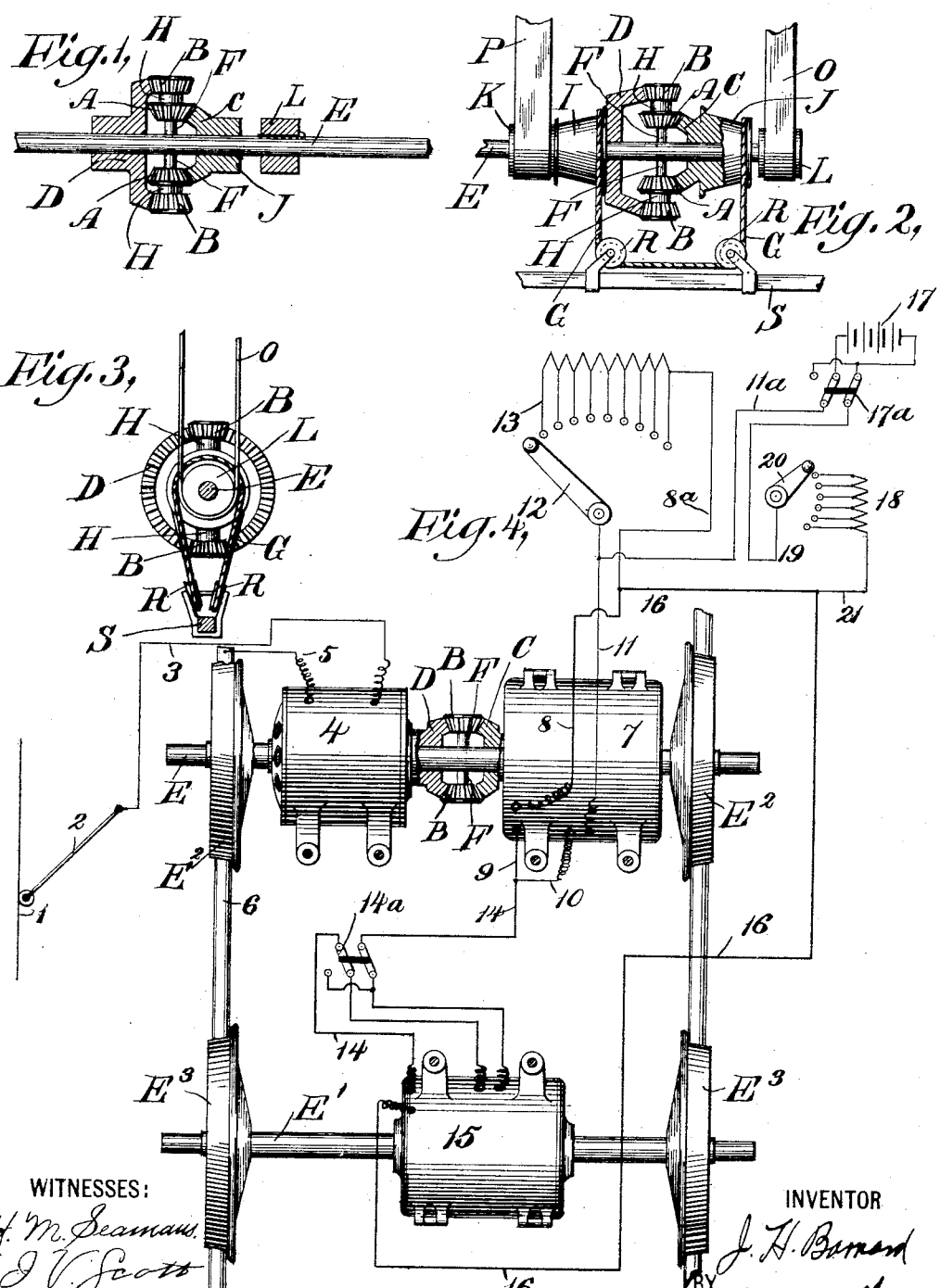

UNITED STATES PATENT OFFICE.

JOHN HALL BARNARD, OF NEWARK, NEW JERSEY, ASSIGNOR OF ONE-HALF TO BENJAMIN ATHA, H. G. ATHA, H. B. ATHA, AND C. G. ATHA, OF NEWARK, NEW JERSEY.

METHOD OF TRANSMITTING POWER FOR PERFORMING USEFUL WORK.

SPECIFICATION forming part of Letters Patent No. 696,301, dated March 25, 1902.

Application filed October 23, 1901. Serial No. 79,624. (No model.)

*To all whom it may concern:*

Be it known that I, JOHN HALL BARNARD, residing at Newark, in the county of Essex and State of New Jersey, have invented certain new and useful Improvements in Methods of Transmitting Power to Perform Useful Work, of which the following is a full, clear, and exact description, such as will enable others skilled in the art to which it appertains to make and use the same.

The object of my invention is to produce an improved method and apparatus for the operation of machinery of all kinds by power, whether by electricity or by gas or vapor motor or by steam or by hydraulic means, and especially machinery of the character which it is desired to vary in speed and reverse in direction when driven from a source of power of which the speed is not readily altered.

The invention is therefore well adapted for use in long-distance electric street-railway work, where an alternating current is used, and is also applicable to the running of automobiles, planers, elevators, and all classes of machinery, as above stated.

In carrying out my invention I make use of certain characteristics that I have discovered in differential gearing and use with said gearing any motor, as above indicated. Considering the differential gearing to consist of three members, if to one member of the train power be applied in a manner to cause this member to revolve about the common axis of travel and sufficient resistance be offered to the other two members a resultant action and reaction is set up between the second and third member. As this action and reaction must be equal and opposite, the work done by the second member must equal that done by the third. All the power therefore transmitted through any increment of time to the first member is (with the exception of the small amount necessary to overcome friction in this member) divided into two exactly equal parts, which parts I hereinafter designate the "primary or useful load" and the "secondary, balancing, or controlling load."

In carrying out my invention I divide the power delivered to the first member of a differential gear into two equal parts, one being transmitted through the second member of the gear and the other equal part to perform work immediately or to store it up or return to the first member.

My invention will be better understood by the following description and reference to the accompanying drawings, which form a part of the specification.

In the drawings, Figure 1 is a sectional view of one form of differential gear that I use in carrying out my invention. Fig. 2 is a sectional view of this form of differential gear, wherein the power expended in the third member is returned to the first member by belting which running over inverse cone pulleys affords an improved means of governing the speed and direction of the second member. Fig. 3 is an end view of the apparatus shown in Fig. 2. Fig. 4 is a diagrammatic view of a truck equipped with an alternating-current motor driving one axle and a direct-current generator on the same axle, the current from the generator driving a series motor on the other axle, the differential gearing being on the first axle between the alternating-current motor and the direct-current generator, the first member being connected to the alternating-current motor and the third member to the direct-current generator. Fig. 5 shows the first axle equipped with a steam-engine which is substituted for the alternating-current motor, this steam-engine being geared to the first member of the differential gear. Fig. 6 shows a system in which the alternating-current motor is journaled on the first axle of the car and connected to the first member of the differential gear, as in Fig. 4. In this case a pump is substituted for the direct-current generator and a water-motor is geared to the other axle of the car. Fig. 7 shows a motor-vehicle equipped with the device shown in Figs. 2 and 3, the first member of the differential gear being driven by a vapor-motor. Fig. 8 shows the alternating-current motor attached to the first member of the differential gear. The third member is connected by a sprocket-chain to the armature of a unipolar generator on the other axle, the latter being used as a magnetic clutch.

In order to make the deduced mathematical expressions which follow more general, I have in Fig. 1 made the members of the differential gear less symmetrical than usual. In Figs. 2 and 3 the same arrangement shown in Fig. 1 is maintained; but in the succeeding figures the usual arrangement is followed.

In the different views similar letters and numerals of reference designate the same parts throughout.

I will first describe the construction shown in Fig. 1 and the operation and theory thereof before going into the construction and operation of the devices shown in the other figures.

Referring now to Fig. 1, the part marked E represents a shaft upon which are loosely journaled the two bevel-gears D and C. F represents two spindles rigidly attached to the shaft E and which carry the sleeves H, upon which are rigidly secured the bevel-gears B A, meshing, respectively, with the gears D and C. Let $a$, $b$, $c$, and $d$ represent the respective diameters of the gears A, B, C, and D and suppose that through an equal period of time a radius of D moves through $n$ degrees of arc and that a radius of C moves through $n'$ degrees of arc in the opposite direction and the spindle F moves through $n''$ degrees of arc in the same direction as D. As the gear D intermeshes with B the former moves through the angle $n''$ plus an angle dependent upon the revolutions of H about their own axes and the ratio $\frac{b}{d}$. A, intermeshing with C, rotates the sleeve H about its axis an amount dependent upon the angle $n''+n'$ and the ratio $\frac{c}{a}$. From this we have the following equation:

$$n = n'' + (n'' + n') \frac{b}{d} \times \frac{c}{a}. \quad (1)$$

From the fact that the spindles F are the axes of the pinions B and A it is clear that if C meets with any resistance $p'$, D in order to move it must exert a pressure $p \frac{a}{a+b} p'$, and F, as the fulcrum, will be acted upon by a pressure $p'' = p + p'$. If this be sufficient to produce motion in the second member, we will have established an action and reaction between these two. By the term "reaction" I mean that the third member will rotate in the opposite direction from that of the second member and at a speed inversely proportional to the resistances encountered by each. Now from the well-known law of physics, action and reaction being equal and opposite, the speed of each member multiplied by its resistance is equal to the product of the same factors in the other. In other words, the work done by each member is equal, and the power therefore has been divided into halves. The gears B A, being on the spindles which are attached to the shaft, will transmit power through the shaft and pulley L, keyed thereto, to perform work. The other work is performed by power transmitted from the gear C through pulley J, attached thereto. Assuming that these values of $p$, $p'$, and $p''$ are measured at equal distances from the common axis of rotation, then the work done in each of the three members may be written:

$$n\,p, \; n'\,p', \text{ and } n''\,p''.$$

Whence $$n\,p = n'\,p' + n''\,p'', \text{ and } n'\,p' = n''\,p''. \quad (80)$$

Substituting, $$n\,p = 2\,n''\,p'', \text{ or } n'' = \frac{n}{2} \times \frac{p}{p''}. \quad (2)$$

Likewise $$n' = \frac{n}{2} \times \frac{p}{p'}. \quad (3)$$

From these equations it is clear that the speed factor of the work done by the second member of such a train will be the quotient of work done in the third member divided by the resistance offered the second member. Consequently we have a train in which the speed ratio between the driving and driven parts is the minimum at which the power available can overcome the resistance of the moment. This characteristic is of course of especial importance in the propulsion of any machinery wherein the load is to be started from a state of rest, quickly accelerated in speed, or, as in planers, &c., heavy moving parts are to be reversed, for while the inertia is being overcome there is available an enormous multiplication of the power factor in the primary load at the expense of speed, and as the inertia is reduced and speed becomes more and more desirable the gearing responds. Instead, therefore, of being obliged to adopt a ratio of gearing that affords the necessary power for the maximum effort and limits the speed after this is accomplished a high load speed is obtainable, and incidentally the variation of load upon the line-shaft or prime motor is greatly reduced. That this change of speed ratio may not result in undue speeds in the primary load and that the energy expended in the second member shall be conserved it is only necessary to choose for a secondary load one that is easily governable in quantity and disposable to some useful purpose, and if this choice be one that is easily measurable in quantity it affords a ready means of determining the amount of the primary load. Of those that fulfil the first two requisites probably pumps or electrical machinery are best suited, or, if a measurement of the primary load is the sole purpose of transmitting it through such a train, a Prony brake may be adapted. If a pump of any kind be selected, the load it imposes upon the third member is easily regulated by any usual means, like a by-pass valve, or if, as in some classes of winding-machines, the pull exerted by the reel must be constant notwithstanding the number of layers upon it the pump may be required to operate against fixed conditions. If an electric load be adopted, the means of governing are multitudinous. For instance, if, as above, a constant load is required any constant duty, like a fixed number of lamps, may be connected with a dynamo driven by the third member. If it is to be a governable load, the output of current may be controlled by an adjustable resistance in the field-coils of a shunt-machine. With either of these forms of secondary load the energy may of course be expended immediately in a motor adapted to be driven by the pump or dynamo used as a secondary load, may be used as heat, or may be stored in a proper reservoir for future employment. As, however, such secondary loads as those mentioned may not be suitable to the conditions or circumstances, the reaction in the third member may be returned again to the first member or even to the source from which the first member draws its energy by means of belts or gearing. Having described these characteristics of the differential gear, I now proceed to show in detail how they may be usefully employed, and as it is impossible to show all the applications that would naturally follow I give a sufficient number of typical arrangements to make its use in other cases perfectly clear.

Referring now to Fig. 4, in which I have shown it adapted to long-distance electric-railway work where an alternating current is used, and a system of electrical distribution as applied to an electric-motor car: The part marked 1 represents the line-wire through which the current is conducted from the power station; 2 is the trolley used to take current from the line and carry it through the conducting-wire 3 to an alternating-current motor 4 loosely journaled on the axle E of a car-truck which has the ordinary wheels $E^2$ on the ends thereof. 5 is the return-wire, connected to the track 6 to return the current. 7 is a direct current-generator on the same axle, and 8 and 9 are wires connected to the brushes leading to and from the armature of this generator. The current generated in 7 passes by one brush through the wire 9 and divides. A small portion passes through the wire 10, which surrounds and excites the field-magnet of the generator, and is returned through the wire 11, the switch 12, resistance 13, wire 8, and $8^a$ back to the other brush of the generator. 14 is the main current-wire, connected to 9, leading through an ordinary pole-changing switch $14^a$, which controls the direction of the current through the field-coil of the series motor 15, which is carried on the other axle E′ of the truck, said axle having wheels $E^3$ on the ends thereof. 16 is the return-wire from the series motor 15 to the generator 7, and the current is returned through this wire and through wire 8 to the second brush. In some cases it may become necessary to excite the field in starting the generator. The exciting-battery 17 may be used for this purpose. This battery is connected to the variable resistance 18 by the wires 19 and switch 20. Leading from the other end of the resistance is the wire 21, connected through the wire 16 to the return-wire 8, the other pole of the battery being connected to the wire 11 by wire $11^a$. Between the wires $11^a$ and 19 is a pole-changing switch $17^a$. When the battery 17 is not to be used to generate a current in the field, it is thrown out of circuit. In the operation of this system current is taken from the line-wire 1 by the trolley and conducted to the alternating-current motor 4. The first member D of the differential gear, being loosely journaled on the shaft and connected with this motor, turns with it. The work to be done from this first member is divided or taken up by the members B and C. The member B is journaled to the spindle F, which is rigidly attached to the axle E, and the third member C is loosely journaled on the axle and connected to the armature of the motor 7 and rotates said armature. The work done through the spindles carrying B is used to turn the axle E and the wheels $E^2$, carried thereon, to drive the car. The work done by C—the third member—generates current in 7, which is transmitted to the series motor 15, the armature of which, being rigidly connected to the axle E′, turns it to drive the wheels $E^3$ to assist in propelling the car. Supposing the car to be at rest, at which time the field-circuit is open and the third member and the armature of the generator 7, connected thereto, are rotating idly, desiring to start the car the field of the generator 7 is slightly magnetized by throwing the battery 17 in circuit with the field-wires 10 and 11. The magnets of the field being started by the battery-current, it is built up or increased by some of the armature-current resulting from the rotation of the armature by the third member C in the magnetic field, when the battery, being no longer necessary, is cut out. The amount of armature-current so used is regulated by the position of the switch 12 on the resistance 13. The current generated in 7 passes from it through one brush through wires 9 14 and switch $14^a$ to the series motor 15, which is used to turn the axle E′ and wheels $E^3$, the current passing out of this motor through the wire 16 and returning to the other brush of the generator by the wire 8. The amount of work done in the generator 7 and utilized in motor 15 determines the reaction or work done by the second member in driving the axle E, as will readily appear from the above description of Fig. 1. Should it be desired to start the car more rapidly or should the car in running encounter a grade requiring more energy, the switch 12 is thrown over to the right to reduce the resistance of the field-circuit, thereby increasing the amount of current generated, hence increasing the effect of the motor 15 on wheels $E^3$ and causing greater reaction in the second member B, developing more power in that member and the wheels $E^2$ connected therewith. Supposing that it is desired to reduce the speed or that the car is going downgrade, where less or no work is required, the field of the generator is weakened or opened by moving the switch 12 more or less to the left to include more resistance. It is therefore plain that the entire control of the car is effected by regulating the field of the generator 7. Hence the motor 4 might be an alternating-current motor, as here shown in Fig. 4 and above described, or a direct-current motor, or a steam-engine, or other suitable motor. When the car is to be run in an opposite direction from that above described, the motor 4 is first reversed in the usual manner. The reversal so caused of the armature of the direct-current generator 4 makes it necessary that the polarity of the magnetic field should also be changed. This is accomplished by reversing the poles of the exciting-battery 17 by means of the pole-changing switch $17^a$. These two reversals result in the main current always flowing in the same direction. Reversal of the series motor 15 is accomplished by reversing the fields by means of the pole-changing switch $14^a$. The power or speed in this direction is then controlled, as before, by varying the field strength of the generator 7.

In this system the direct-current generator 7 constitutes a secondary or controlling load, the energy expended in it being immediately utilized in the series motor to assist in driving the car. The primary load is that delivered by the second member B directly to the axle E and wheels $E^2$. The governing of the work done in the generator 7 not only regulates the energy applied to wheel $E^3$, but in balancing the work done in the member B determines the amount of the work done in axle E, which is what I designate the "primary" load. Where an electric generator forms a secondary load in railway-work, the multiple unit control of two or more cars in a train is easily effected by controlling the field-circuits of all these generators from the controlling mechanism of any car.

Fig. 5 shows a steam-engine $4^a$ substituted for the alternating-current motor 4 in Fig. 4. This engine is connected to the first member D by the gears 22 23, the latter loosely surrounding the axle E. The regulation of the speed and direction of movement of the car may be controlled through the same system as that shown by Fig. 4.

Fig. 6 shows the alternating-current motor 7, carried by the axle E. In this case the direct-current generator is replaced by a rotary pump $7^a$, centered upon the axle E and driven by the third member C of the differential gear. On the other axle $E'$ of the car is supported a water-motor $15^a$, connected to and adapted to drive this axle through the gears 24 and 25. The pump $7^a$ is connected to the motor $15^a$ by the pipe 26, through which water is forced under pressure to drive $15^a$. 27 is a discharge-pipe returning the water to the pump $7^a$. 28 is a by-pass controlled by the valve 29. In this system the car is maintained in a state of rest by opening the by-pass valve 29 to its full extent, allowing the water to circulate idly. To start the car, the valve 29 is closed, gradually forcing more or less of the water to circulate through the motor $15^a$. In this system the pump $7^a$ and motor $15^a$ constitute a controllable secondary load, the energy of which is applied to the axle $E'$ to assist the primary load to drive the car. In order to reverse the direction of the car, the motor 4 is reversed and the water from the pump $7^a$ is directed by the three-way valve 30 through the pipe $26^a$ into another water-motor $15^b$, which through the gear $24^a$ will rotate the axle $E'$ through gear 25 in the opposite direction.

In Fig. 8 the first member D of the differential gear is driven in either direction by the armature of the motor 4, which is connected to the line in the same manner as shown in Fig. 4. In this arrangement the third member C is connected by a sprocket-chain 32 to the armature 31 of the unipolar generator on the axle $E'$. This armature is journaled upon an insulated sleeve $31^a$ on an extension of the fields 33, which are keyed to the axle $E'$ and revolve with it. The field-coils 34 are in series with a variable resistance $r'$ and the armature-circuit. In parallel with the variable resistance is a switch $t$, a battery $17^a$, and a variable resistance $r$. When the fields are magnetized by the battery $17^a$ or by current from the armature-circuit, a drag is produced between the armature and pole-pieces, causing the latter to tend to rotate the axle $E'$ and wheels $E^3$. The strength of this magnetization determines the amount of current generated through the parts of this generator and the consequent drag desired. When it is desired to reverse the car, it is only necessary in this instance to reverse the alternating motor. When for any reason the above forms of secondary loads are not suited or the conservation of the energy delivered to them is inconvenient, the reaction in the third member of the differential gear may be returned to the first member or to the source of power from which the first member obtains its energy by means of belt or gearing. In Figs. 2 and 3 I have shown an apparatus for returning it by belt in a manner that permits wide and controllable variations of $n$, $n'$, and $n''$, and the resultant $p'$ is returned by the belt G toward energizing the first member. In these two figures the cone-pulleys I and J are shown attached to the first and third members D and C, respectively, and the rope belt G is led from one to the other by the guide-rollers R, carried by the shipper S. K is a pulley attached to I, hence to D, and L is a pulley attached to the shaft E. Power is delivered to K by any means, such as the belt P. The action set up in E is led to the primary load by the belt O and the reaction in C returned from J to I, the first member, through the belt G.

It will be noticed that in any of the arrangements that I have herein described the only speed requirement in the first member is that it shall be fast enough to produce a sufficient maximum speed in the primary load, and with proper proportioning of the differential and the cone pulleys, arranged as in Figs. 2 and 3, both forward and reverse motion may be produced in the shaft E by merely shifting the belts, for in equation 1 referred to above in describing Fig. 1, if $$n' = \frac{a\,d}{b\,c}\,n,\ n'' = 0;$$

hence if $n'$ becomes greater than that, $n''$ becomes a minus quantity. Proportions may therefore be selected that $n''$ may be made to vary between selected limits on either side of zero.

In Fig. 7 a motor-vehicle is shown in which the first member of the differential gear D is driven by a vapor-engine T and the secondary load returned to the first member by the mechanism shown in Figs. 2 and 3. On the shaft E is a sprocket L', by which the primary load is led to the ordinary differential gear M on the rear axle E'. To allow the vehicle to coast under its own momentum, the shipper is arranged to be lowered, so as to slack the belt. This is done by mounting the shipper on hangers N and on eccentric rollers O', having a rack and pinion P P' connected thereto. By throwing the lever Q, which is connected to the rack by a bell-crank lever Q', in one direction or the other the eccentric rollers will be rotated to raise or lower the shipper S and to either tighten or slacken the belt. The longitudinal movement of this shipper to shift the position of the belt G on the cone-pulleys I J is accomplished through the bell-crank lever S'. The position of the belt G on these cone-pulleys I J controls the speed of the vehicle, also the stopping of the vehicle, and also its reverse motion.

I am aware that others have used the differential gearing in the solution of certain specific problems; but the result in each case within my knowledge exhibits a lack of appreciation of the full functions of such gearing, and their exposition of their inventions fail to make known the general characteristics of the internal reactions in a manner that exhibits its adaptability to the many broad uses that would logically follow. Typical of this is an effort to minimize the loss through heat in the old friction-band by driving the third member by a worm actuated by the expenditure of a small amount of power taken from the face of the first member. In this instance, for example, it is impossible to conceive that the third member is reacting to return power to the first through the worm. Moreover, in this arrangement the worm actually locks the third member if the friction-wheel used to drive the worm from the face of the first member be removed therefrom.

In another instance the electrical reactions between two dynamo-electric machines are employed, and it is essential that they alternately become dynamos and motors, thereby prohibiting that one of them be an induction-motor or a prime motor, such as an explosive vapor or a steam engine.

Having described my invention, what I claim as new, and desire to secure by Letters Patent, is—

1. The method of transmitting power which consists in dividing the power derived from a given source into two always equal parts and conveying each of these two parts to perform independent work.

2. The method of transmitting power which consists in dividing the power imparted to a mechanism into two equal parts and conveying both parts toward the performance of the same work, the first equal part directly and the second indirectly, through a means of control.

3. The method of transmitting power derived from a given source which consists in dividing this power into two always equal parts, conveying one of these parts to perform any desired work and converting the other equal part into potential energy.

4. The method of transmitting power derived from any given source, which consists in dividing this power into two always equal parts and conveying one of these parts for use for any desired work and the other part to operate a controllable load.

5. The method of transmitting power derived from any given source, which consists in dividing this power into two always equal parts and conveying one of these parts for the performance of any desired work and the other to operate a variable controllable load.

6. The method of transmitting power derived from a given source, which consists in dividing this power into two always equal parts, conveying one of these parts for the performance of any desired work, conveying the other for the performance of independent work, and controlling the work done by the first part by governing a load substantially frictionless carried by the second equal part.

7. The method of transmitting power derived from any given source, which consists in dividing this power into two always equal parts, conveying one of these parts to be used for the performance of any desired work, conveying the other part independently of the first, governing the work performed by the second part, and controlling the work performed by the first part by the governed work of the second part.

In testimony whereof I affix my signature in the presence of two witnesses.

JOHN HALL BARNARD.

Witnesses:
 WM. A. MEGRATH,
 H. M. SEAMANS.